United States Patent [19]

Ciokajlo et al.

[11] Patent Number: 5,052,828
[45] Date of Patent: Oct. 1, 1991

[54] BEARING ASSEMBLY FOR USE IN HIGH TEMPERATURE OPERATING ENVIRONMENT

[75] Inventors: John J. Ciokajlo; Jeffre G. Loewe, both of Cincinnati, Ohio

[73] Assignee: General Electric Company, Cincinnati, Ohio

[21] Appl. No.: 528,520

[22] Filed: May 25, 1990

[51] Int. Cl.⁵ .............................................. F16C 37/00
[52] U.S. Cl. .................................... 384/476; 384/480; 384/493; 384/540; 384/575; 384/581; 384/585
[58] Field of Search ............... 384/476, 480, 493, 540, 384/575, 581, 585

[56] References Cited

U.S. PATENT DOCUMENTS

| | | |
|---|---|---|
| 3,097,895 | 7/1963 | Matt . |
| 3,485,538 | 12/1969 | Nogle et al. . |
| 3,532,402 | 10/1970 | Berry et al. . |
| 4,329,000 | 5/1982 | Keske .................. 384/493 |
| 4,545,691 | 10/1985 | Kastan et al. ........... 384/540 |
| 4,547,083 | 10/1985 | Hörler ..................... 384/535 |
| 4,655,614 | 4/1987 | Schott . |
| 4,668,108 | 5/1987 | McHugh . |
| 4,749,288 | 6/1988 | Tilcn et al. . |
| 4,795,280 | 1/1989 | Dobhan et al. . |
| 4,952,076 | 8/1990 | Wiley et al. ............. 384/535 |

*Primary Examiner*—Lenard A. Footland
*Attorney, Agent, or Firm*—Jerome C. Squillaro

[57] ABSTRACT

A support bearing assembly for supporting a jet aircraft engine high speed rotor shaft where an operating temperature of up to 1500 degrees F. is involved and the bearing unit is exposed to such temperature condition, includes a rolling elements-inner and outer race bearing unit capable of operating at such temperature level without adverse effect and, e.g., these components being comprised of ceramic matrix composites. Since such a bearing unit will have different thermal growth than its metallic support housing, the bearing unit is supported in pairs of opposed cylindrical cages, there being an inner cage pair for holding the inner race and an outer cage pair for holding the outer race. The cages have flange means at one end and circularly, spaced support arms extending from the flanges a distance to cage opposite end locations where the support arms are formed as finger structures which interfit with the race members, the spacing between the support arms defining slots in the cage bodies. Fixing pins are carried in the finger structures and interfit with passages or grooves formed in the races. The support arms are flexible in the radial direction but are stiff in tangential or circumferential directions so the radial flexibility permits radial thermal differential growths in the supporting components while keeping the bearing unit supported and radially constrained. The cage units will have high thermal expansion characteristics whereas others of metallic components in the assembly will be intermediate value with that of the ceramic bearing unit being the lowest.

24 Claims, 4 Drawing Sheets

BEARING ASSEMBLY FOR USE IN HIGH TEMPERATURE OPERATING ENVIRONMENT

BACKGROUND OF THE INVENTION

The present invention relates to a bearing assembly for supporting a high speed element such as the rotor of an aircraft engine and, more particularly, to a rotor support bearing assembly for use in an engine operating environment wherein environmental temperatures span the range cold state to as high as 1500 degrees F.

Aircraft jet engines operating at relatively low temperatures present no especially difficult problems regarding proper rotor support and lubrication requirements. If lubricant temperatures do not exceed about 300 degrees F., the lubricants can be retained for reasonably good service life. On the other hand where engine temperatures are dramatically increased and lubricants used in the engine exposed to temperatures as high as 600 or 700 degrees F., such lubricants must receive special treatment after each use such as addition of thinners. Rotor support bearing assemblies used under conditions as aforesaid do not particularly present a drawback. On the other hand, there is constant demand for increased engine capacities and this demand carries with it higher engine operation temperatures, temperatures such as in the range 1200 to 1500 degrees F. Aside from the expense of providing lubricants satisfactory for use at such temperatures even if they could be used with conventional metallic bearing units and bearing supporting structure, there is the problem that metallic bearing units are not envisioned as satisfactorily performing at the higher engine temperatures. High temperature, dry or non-lubricated, ceramic matrix composite bearings can be used but conventional metallic bearing attachment modes, if used with a ceramic bearing unit will result in extremely high inner race thermal stresses and outer race looseness. This is because conventional metallic bearing attachment methods do not negate differential thermal growths as will occur where a ceramic bearing unit is embodied in the engine by means of metallic support structure. Also conventional attachment techniques do not allow that the bearing unit will be kept rigidly clamped throughout engine operation.

OBJECTS AND SUMMARY OF THE INVENTION

Accordingly, it is an object of the invention to provide a bearing assembly for use in high temperature operating environment which overcomes the drawbacks of the prior art.

It is a further object of the invention to provide a bearing assembly which employs a ceramic composite as the bearing unit, the mounting and support for the bearing unit being with metallic components but effected in such way that differential thermal growths are negated and the bearing unit remains rigidly clamped throughout engine operation.

Briefly stated, there is provided a support bearing assembly for supporting a high speed rotor such as that of an aircraft jet engine wherein the bearing is in an operating environment up to 1500 degrees F. The bearing assembly includes a bearing unit of a ceramic matrix composite having inner and outer races with rolling elements sandwiched between the races. The bearing unit is supported in pairs of opposed cylindrical cages, there being an inner cage pair for holding the inner race and an outer pair for holding the outer race. The cages have flange means at one end and circularly, spaced support arms extending from the flanges for a distance to cage opposite end locations where the support arms include finger structures which interfit with the race members, the spacing between the support arms defining slots in the cage bodies. Fixing pins and/or grooves are carried in the finger structures and interfit with passages formed in the races. The support arms are flexible in the radial direction but are stiff in tangential or circumferential directions so the radial flexibility permits radial differential growths in the supporting components while keeping the bearing unit supported and radially constrained. The cages will have high thermal expansion characteristics whereas, others of metallic components in the assembly will be of intermediate value with the ceramic bearing unit having the lowest value.

In accordance with these and other objects of the invention, there is provided a rotor support bearing assembly for supporting a high speed rotor shaft operating in a high temperature environment which comprises a bearing unit having an inner race member, an outer race member and rolling-elements captively held between the races, the inner race member encircling an axial length portion of the rotor shaft. A first pair of flexibly structured support members are concentric with the inner race member and disposed one at each of opposite sides of said inner race member, said first pair support members having interfitting joinder with said inner race. A second pair of flexibly structured support members are located radially outwardly of the first pair, said second pair being concentric with the outer race member and disposed one on either side of the outer race, said second pair of support members having interfitting joinder with said outer race member. A housing closely encircles the second pair of support members. The respective support members, housing and bearing unit are made of materials which have respective and relatively high, intermediate and low thermal coefficients of expansion whereby during high temperature operation, the flexibly structured support members will tend to grow thermally outwardly to greater extent than the housing but such members being caused to deflect radially inwardly due to lesser growth of the housing and therewith impose radial constraint on the outer race member that prevents loosening of the outer race member in the bearing unit.

The above, and other objects, features and advantages of the present invention will become apparent from the following description read in conjunction with the accompanying drawings, in which like reference numerals designate the same elements.

DESCRIPTION OF THE PREFERRED EMBODIMENTS

The bearing assembly of the present invention is described in terms of preferred embodiments thereof as used in an aircraft jet engine for supporting the engine rotor. It will be appreciated by those skilled in the art that the bearing assembly can be used in other environments where high temperatures and expansion of bearing unit and assembly support components present problems of bearing unit looseness or slack since the bearing assembly of the invention insures tightness of the bearing unit at all times and over a wide range of bearing operating temperatures.

Figure 1:
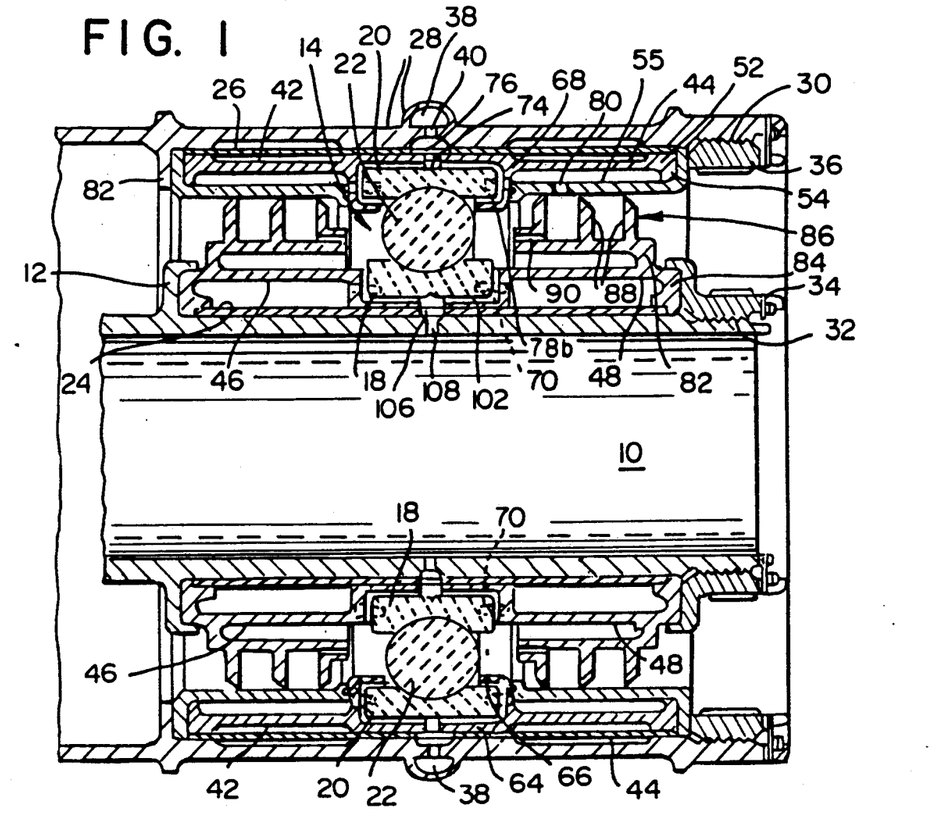
FIG. 1 is a vertical central sectional view of a bearing assembly constructed in accordance with the principles of the invention, the rotor shaft being shown in full.

Referring to FIG. 1, rotor shaft 10 is a hollow component forming part of the jet engine structure (not shown), the shaft carrying a flange 12 a part of which extends radially a short distance out from the shaft, and a part which follows a short axial run so that the flange presents a clamping structure for reasons as will be described later on. A length of the rotor shaft 10 is journaled in bearing unit 14, the bearing unit including an inner race member 18, an outer race member 20 and rolling elements 22 sandwiched between these two races. The rolling elements 22 can be balls or rollers. The bearing unit will be supported in the engine with various and/or all of the components as will be described; collectively, these components and the bearing unit constituting a bearing assembly which can be a self-contained structure package that simply and readily can be field-installed and replaced with minimum aircraft out-of-service time. Further, use of a replacement package assembly lessens the chances of bearing unit misalignments and other maintenance/repair shortcomings since bearing assembly fabrication takes place under carefully controlled conditions, whereas, field replacement or rebuilding of bearing units may have to be done under constraint of battle conditions and/or limited time availability. The package assembly will include an inner sleeve 24 and an outer sleeve 26 as the principal assembly retaining components. Where the inner sleeve is used, it will intervene the shaft external surface and the inner race member 18. A sump housing 28 encircles the entire assembly of components and it in turn will be securely supported from a fixed member (not shown) in the engine structure such as a part of the engine casing. Where outer sleeve 26 is employed, it will lie adjoining the sump casing inner surface and intervening the sump casing and the bearing unit outer race member 20.

The sump casing will at an end thereof have an internal thread 30 and an end section of rotor shaft 12 is externally threaded as at 32 so that these threaded sections can receive the respective external and internal locknuts 34, 36 by means of which the bearing assembly is locked under condition of axial constraint in the engine. Sump housing 28 includes an annular enclosed sump or passage which is connected with a source of cooling medium for purposes as will be described later on, the interior of the sump passage having a number of ports 40 therein, the ports being arranged at circularly spaced locations around the passage.

With reference to FIG. 1 and additionally FIGS. 2 and 3, the essential and main bearing unit support components now will be described. The main bearing unit support is provided by two pairs of elongated cages, the cages 42, 44 being associated with support of the outer race member 20 and the cages 46, 48 being associated with support of the inner race member 18. The cage members comprise elongated, generally cylindrical bodies having a radial flange part at one end and a plurality of support arms extending from the flange part in an axial direction, the support arms being arranged in a circularly spaced array of the arms such that the cage bodies have longitudinally directed slots therein. The arms at the other ends of the bodies have finger structures as will be described below.

Figure 2:
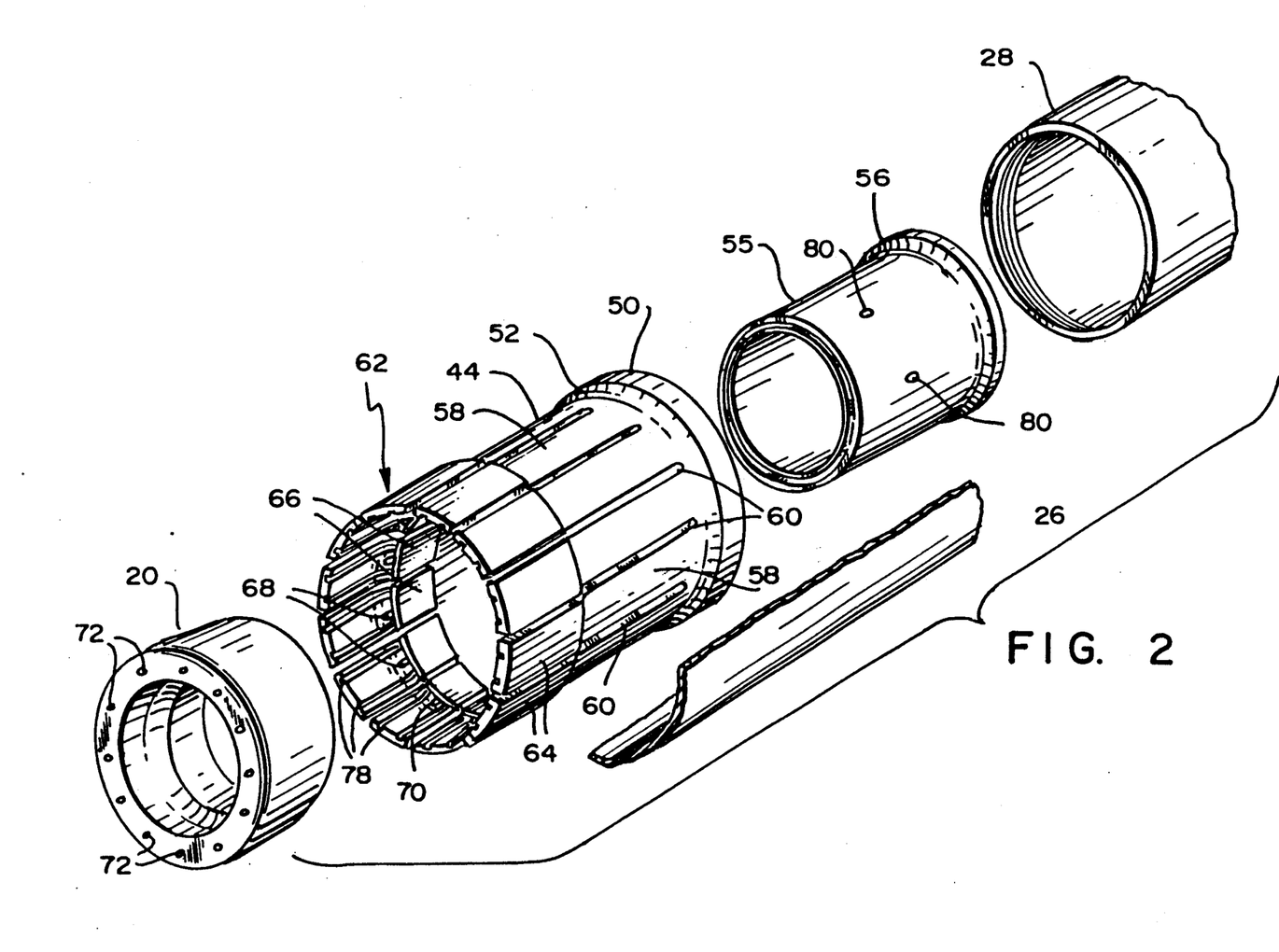
FIG. 2 is an exploded perspective view of the components associated with support of the bearing outer race member, fragments only being shown of the sump housing and the outer sleeve in which the assembly is contained.

FIG. 2 shows one of the pair of outer cages, that depicted being the cage 44 on the right side in FIG. 1, it being understood that cage 42 is duplicate to cage 44 but being reverse oriented with respect thereto in the axial alignment of each with the other when these cages are in outer race member supporting configuration. Cage 44 has a radial flange 50 formed on one end, this flange having the outwardly directed portion 52 shown in FIG. 2, and it may also have an inwardly directed portion 54 as seen in FIG. 1, the outer portion 52 engaging the inner surface of sleeve 26 when the components are assembled, and the inner portion the external surface of the outer seal shell 55, the outer seal shell being a cylindrical member received concentrically in the cage 44 and having an end flange 56 which abuts the flange 50 of cage 44 when these components are assembled.

Cage 44 includes the plurality of circularly spaced, axially extending support arms 58, the spacing between the respective arms defining long slots 60 and providing certain flexibility to the support arms, i.e., each arm can flex to a degree when a radial load is imposed thereon and to flexibly yield radially when a thermal growth thereof is intervened by presence of a structure part to prevents full expansion to the extent associated with a given thermal condition. The support arms 58 at the other end of the cage body are shaped in the form of finger structures 62, these finger structures in this instance comprising two separate fingers, a finger 64 offset radially outwardly from its associated support arm and a finger 66 offset inwardly of the support arm.

These two fingers are connected by radial bridgepieces 68, the bridgepieces in one cage embodiment carrying fixing pins 70 extending axially in between the two fingers. These fixing pins 70 are when the outer race member is in interfitting relationship or joinder with the cage member, received in blind axial passages 72 formed at each axial or opposite face of the outer race member 20, a circle of such passages best being seen at the left end of the FIG. 2 depiction. The fixing pins serve, inter alia, to prevent relative rotative movement between the cage and the outer race member. When the outer race member is received on cage 44, the outer circumferential race surface adjoins the inner surfaces of fingers 64 and its inner circumferential surface adjoins the outer surfaces of fingers 66.

As used herein "interfitting joinder" is intended to mean positional relationship between the bearing unit races and their associated cage finger structures such that projecting structure of the finger structures has received in-and-about relation to structure of the races that insures, following cold fit assembly, any radial movement of the races will be unitary with the associated finger structures.

In the cage-race received configuration, the fingers 64, 66 embrace the axial thickness portion of the outer race member as best seen in FIG. 1, the outer fingers 64 having greater axial length than the inner fingers 66, with the outer fingers of one cage 44 confronting but being slightly spaced from those of the other cage member 42 to therewith define an annular space passage 74 encircling the outer race member, a passage which is in communication with sump passage 38 via the ports 40 and ports 76 formed in the outer sleeve 26. The cage fingers 64 are provided with short slots 78, these short slots 78 being formed in the inner surfaces of the fingers as, e.g., two in number and at opposite sides of the fixing pins 70 situate alongside the fingers 64. These short slots 78 extend full axial length of the fingers 64 and continue in the radial inward direction in the annular bridgepieces 68 from whence they course axially again as short slot extensions 78b formed at the inner surfaces of fingers 66. These short slots and the extensions thereof constitute a flow artery along which cooling medium may pass from sump passage 38 in contact with the outer race member for cooling it, the cooling medium also cooling the rolling elements 22 as it outflows from the artery onto these elements as can be best understood by referring to FIG. 1.

As seen particularly from FIG. 2, outer seal shell 55 includes a number of ports 80 circularly spaced around the shell, these ports serving in the assembly to communicate cooling medium flow to the inner region of the assembly and as will be explained later in connection with further description of the inner cages 46, 48 given below. When the components are assembled, the radial flange 56 formed on an end of the outer seal shell adjoins in the radial direction, the inner surface of sump housing 28 and it is engaged at one axial face by end edges of both the outer sleeve 26 and the end flanges 50 of the cages 42, 44. The other axial face of flange 56 is engaged with either internal locknut 38 or a face of internal annular stop 82 formed in the sump housing.

Figures 3, 6:
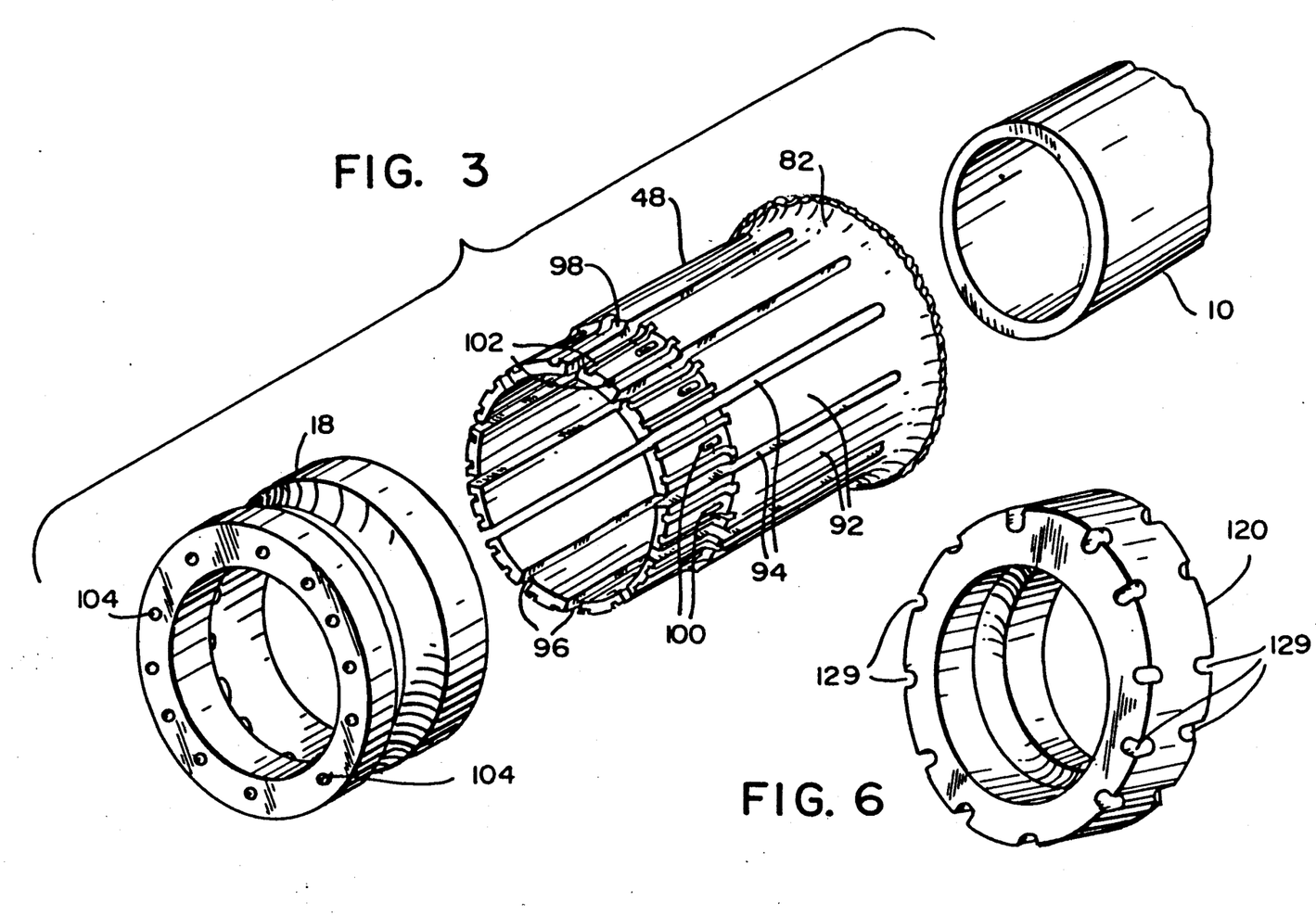
FIG. 3 is an exploded perspective view of the components associated with support of the inner race member.
FIG. 6 is a perspective view of an outer race member showing how the notches referred to in FIG. 5 are formed.

The other or inner pair of cages 46, 48 now will be described with reference being made to the FIG. 3 showing wherein only cage 48 is shown since cage 46 is identical thereto in all respects except in the assembly it will be in reverse axially-aligned orientation with cage 48. Cage 48 includes a flange part 82 at one end of the cage body, this flange part being illustrated with a portion broken away in FIG. 3. The broken away portion is shown in FIG. 1 to which reference is made. The broken away portion includes a short axial length which merges with an annular-shaped internal flange 84 that axially abuts the flanged inner part of external locknut 34, the like part on cage 46 abutting with shaft flange 12. The broken away portion also includes the labyrinth seal member 86, this seal member including plural seal rings 88, the ring proximal the bearing unit having through passages 90 formed therein. The cage 48 and labyrinth seal member 86 are shown in FIG. 1 as being integral. They could be made as separate members as well and the labyrinth seal could in certain cases be eliminated altogether.

Looking again at FIG. 3, cage 48 includes elongated, circularly-spaced axially directed support arms 92, the support arms being intervened by long slots 94, the support arms being formed at the other body end as radially inwardly offset fingers 96, these fingers 96 being joined to the support arms by short radial pieces 98. Fixing pins 100 extend axially from the pieces 98 and short slots 102 are formed on either side of each fixing pin, these short slots being formed in the outer surface of the fingers 94 and including extensions thereof directed radially in the pieces 98 to termination at the outer surface of each support arm. In the assembly, the inner circumferential surface of inner race member 18 is adjoining the outer surfaces of fingers 98 and the fixing pins 100 are received in the opposite face-to-opposite face passages 104 formed in the race, these fixing pins serving the same purpose as fixing pins 70 described above.

The short slots 102 provide communication passage around the inner race member of cooling medium present in the inner region of the assembly such cooling medium being that which accesses the inner region through the long slots 60 of the outer cage pair 42, 44, passes through ports 80 of outer shell member 55, and passes through passages 90 in the innermost labyrinth seal ring 88 to flow against the rolling elements 22 and access the short slots as well. Cooling medium flow which passed around the outer race member will flow along with the inner region medium through the short slot defined passages and will outlet through ports 106 and 108 formed, respectively, in the inner sleeve 24 and the rotor shaft 10. This spent cooling medium can then be outflowed from the shaft interior by means not shown for recycle or discard collection.

Figure 5:
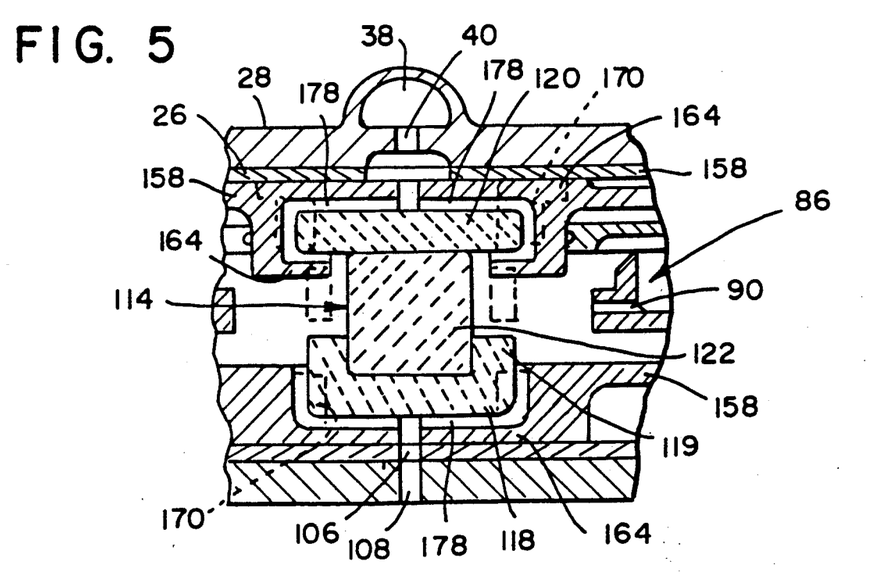
FIG. 5 is a fragmentary half-sectional view of a portion only of the assembly shown in FIG. 1 depicting use of a modified outer cage structure wherein the fixing pins carried in the cage finger structures are radially rather than axially oriented, the pins in this instance locating in notches formed in the opposite side faces of the race members.

FIG. 5 shows in fragmentary section, a modified form of bearing unit 114 in that the inner and outer race members 118, 120 are those employed where the rolling-elements 122 are rollers as distinguished from the ball elements used in the FIGS. 1-3 construction. The finger structures 164 on the outer pair cages 142, 144 like the cages 42, 44, comprise a pair of fingers carried on the associated support arms 158. Further, inner race 118 includes the ball retainer side wall parts 119. A readily apparent difference is the disposition of the fixing pins 170 in radial rather than the axial orientation of the pins 70 described earlier. These pins 170 are arranged in the finger structures in the same manner as the FIGS. 1-3 embodiment in respect of the pins being positioned between short slots 178 in the fingers 164. Other parts in the FIG. 5 showing which correspond with those described in connection with the FIGS. 1-3 structure are shown with the same reference designation as used in the earlier Figures.

The companionly configured structure on the race members with which the fixing pins 170 interfit are shown as same are formed on inner race member 118. There it will be seen that notches 129 are formed at the opposite axial faces of the race member, such notches having the blind termination axial and radial reaches depicted.

Figure 7:
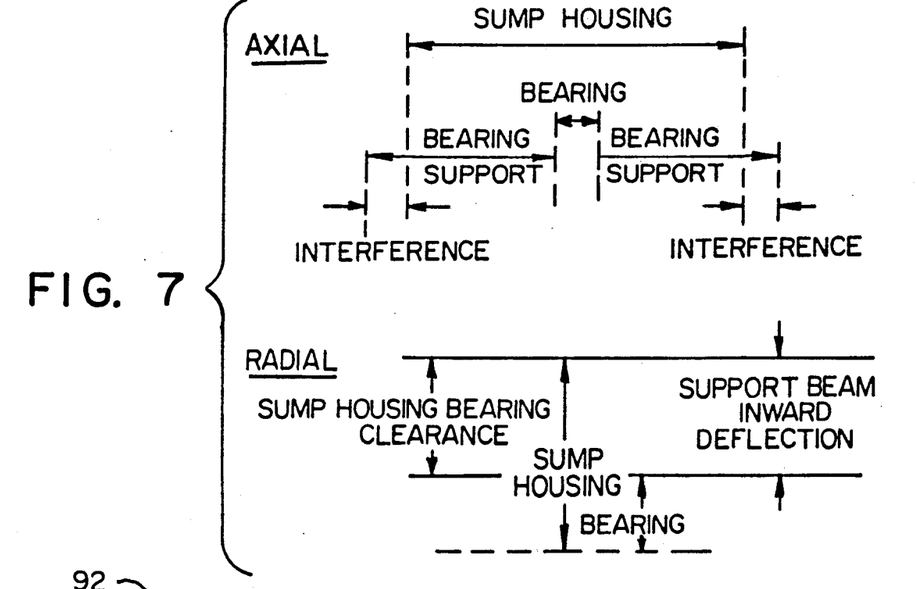
FIG. 7 is a schematic illustration of representative thermal growths involved in use of the bearing assembly in high-temperature operation environments, the respective axial and radial growth parameters shown demonstrating the axial tightening of the assembly and the growth compensating functioning of the cage structures will maintain the bearing unit centered notwithstanding the thermal expansion of the various supporting and assembly components.

With the assembly installed in the use environment at cold state, a certain magnitude of axially-opposite directed compressive force is exerted on the bearing unit races holding them at stabilized fixed axial locations. During engine operation and when the cages axially thermally expand to a more marked degree than can the race members, this compressive force further increases and functions to sustain the axial position of the bearing unit relative to the rotor shaft journaled therein. This effect is shown in FIG. 7 where it is seen that axial thermal expansion of the cages produces a heightened interference ⋯ ⋯ these elements and the ⋯ cages.

In the cold fit state, the outer surfaces of fingers 64 of the have interface contact with the inner surface of the outer sleeve 26 (or the inner surface of housing 28 if no outer sleeve is used) while a gap, e.g., about 0.015 inch exists between the outer surface of fingers 96 and the outer surface of inner sleeve 24. During engine operation where temperature will be, e.g., in a range 1200–1500 degrees F., the housing 28 will grow thermally radially. Because the metallic housing has a higher expansion coefficient than the ceramic bearing unit, there would be tendency for the outer race to become loose. However, the cage member which has a higher coefficient than the housing, also will grow radially but will be constrained by the housing and in consequence, the support arms 58 will be caused to deflect in the radial inward sense and the finger structures 62 and fixing pins 70 to apply radial constraint to outer race 20. FIG. 7 shows how this is produced and that the sum of the bearing expansion and the support arm inward deflection equal the housing expansion. At the same time, rotor shaft 10 and inner sleeve 24 grow thermally radially against cages 46, 48 and form a bearing inner race-bearing support-shaft interference fit.

During "in between" thermal transient operations, the bearing unit is supported by the cages with gaps between the respective cages and the outer and the inner sleeves, the support arms of cages 46, 48 being primarily used in the cold and thermally transient engine operation states.

Figures 4, 8:
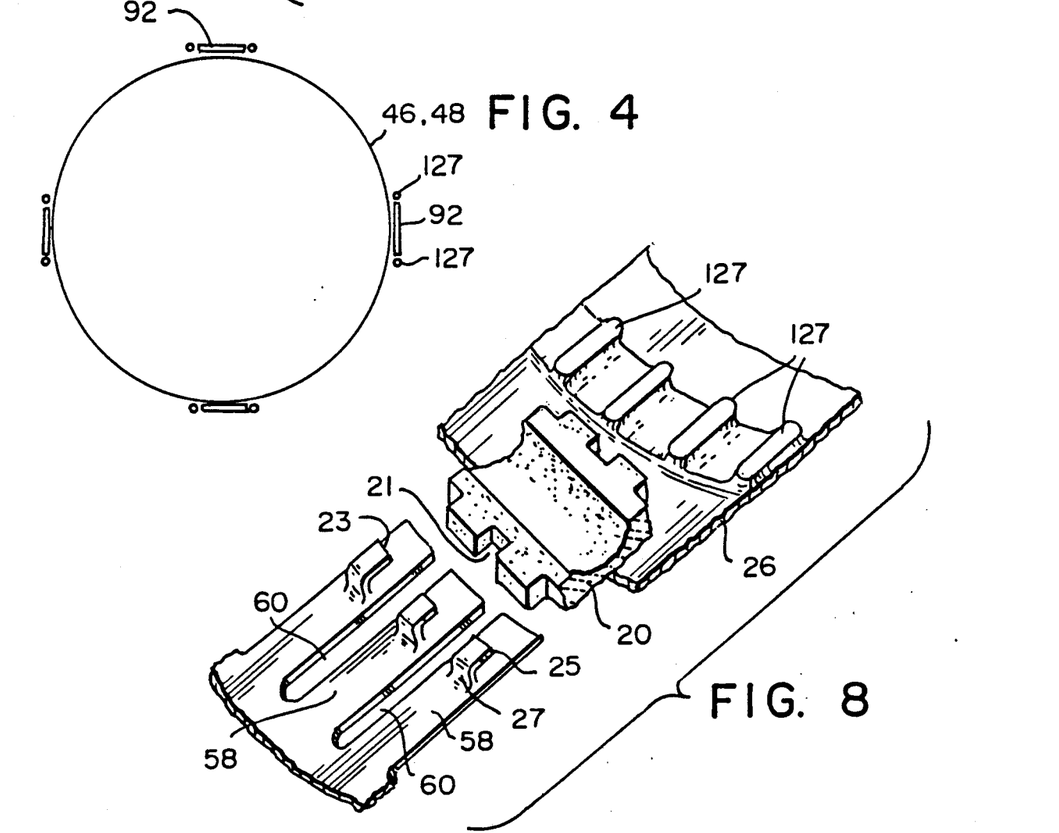
FIG. 4 is a graphic illustration of the principle by which the cage members function to assume radial loadings while maintaining the races centered relative to the rotor shaft.
FIG. 8 is a fragmentary perspective view of a modified form of effecting joinder of the cage finger structures to a race member, and the employment of stops on the inner surface of either the assembly housing or the outer sleeve, such stops be used to limit the extent to which the cage arm members can deflect under radial loadings thereby to prevent support arm failure due to "blade out" conditions.

FIG. 4 illustrates how the cage structures function when radial and tangential or linear loadings are applied thereto. From the standpoint of a direct radial load, the support arms of the cage structures in line with the loading are flexible or weak as to assuming that load. That is shown with respect to a true vertically applied load passing through the support arms at the twelve and six o'clock positions. The support arms at the three and nine o'clock positions are on the other hand rigid or strong in assuming loading acting thereon. As the direction of the load changes, the respective arms go from weak to strong and vice-versa. Thus if a load be applied in the horizontal, the three and nine o'clock arms are weak and the six and twelve o'clock arms strong.

FIG. 8 shows another manner of interfitting the races with their associated support cages only that of interfitting the outer race being depicted as the same holds true for the inner race. Race 20 has notches 21 formed at the opposite axial faces thereof, these notches radially passing from inner to outer circumferential race faces. The finger structures on the cage support arms are formed as lugs 23 with an axial part 25 and a radial part 27. These lugs mesh with the notches 21 to effect the interfitting joinder of the elements.

FIG. 8 also depicts how stops 127 are formed at the inner surfaces of the inner and outer sleeves to prevent excessive support arm bending and possible failure due to high bearing loads caused by "blade out" conditions. These stops are situated such that they are received in the long slots between adjacent support arms. FIG. 4 also shows the placement of these stops.

As stated earlier, the bearing unit can be made from a fiber reinforced ceramic matrix composite. Various materials can be used for the housing as long as the thermal coefficients of expansion are as described above. These coefficients by way of example, might be $2.0 \times 10^{-6}$ In/in per degree F., $6.0 \times 10^{-6}$ and $8.0$ ⋯ fc tl ⋯ ctive ⋯ ng unit, housing and cage components. Representative materials for the housing 28 include titanium alloys and those for the cages could be ferrous-based alloys such as A286 or nickel-based alloys such as R41.

With regard to cooling media, air is a primary selection but other coolant gases may be employed as well. Additionally, a dry lubricant such as graphite powder can be entrained in the cooling medium flow.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Rotor support bearing assembly for supporting a rotor shaft, said assembly comprising
   a bearing unit including an inner race member, an outer race member and rolling-element members captively held between said inner and outer races, the inner race member encircling an axial length portion of the rotor shaft,
   a first pair of flexibly structured support members concentric with said inner race member and disposed one at each of opposite sides of said inner race member, said first pair support members having interfitting joinder with said inner race member,
   a second pair of flexibly structured support members located radially outwardly of the first, said second pair being concentric with said outer race member and disposed one at each of opposite sides of said outer race member, said second pair of support members having interfitting joinder with said outer race member,
   a housing encircling said second pair of support members, and
   oppositely axially-directed force clamping means for urging the respective support member pairs axially against the race members associated therewith,
   said support members, said housing and said bearing unit, respectively, being of materials which have high, intermediate and low thermal coefficients of expansion whereby during rotor shaft operation in a high temperature environment, the flexibly structured support members will tend to grow thermally outwardly to greater extent than the housing but such members being caused to deflect radially inwardly due to the lesser growth of the housing and therewith impose radial constraint on the outer race that prevents loosening of the outer race in the bearing unit.

2. The rotor support bearing assembly of claim 1 in which each flexibly structured support member of the first and second pairs of such members comprises an elongated, cage-like body having a continuous encircling part at one body end and a plurality of axially directed support arms extending a distance from said one body end to common termination location of each defining an opposite end of said body, the support arms at their termination locations comprising finger structures including structure parts offset radially from an associated support arm, said support arms being arranged in a circular spaced array so as to define longitudinal slots between adjacent ones of the support arms, the finger structures having surfaces thereon companionly configured with surfaces on the race member with which they interfit.

3. The rotor support bearing assembly of claim 2 in which the finger structures on the first pair cages are offset radially inwardly of their associated support arms, the inner race member being received on said first pair finger structures.

4. The rotor support bearing assembly of claim 2 in which the finger structures on the second pair cages each comprise first and second finger portions, one finger portion offset radially inwardly and the other finger portion offset radially outwardly of its associated support arm, the outer race member being embraced by the first and second finger portions of each second pair finger structure.

5. The rotor support bearing assembly of claim 2 in which the inner and outer race members are annular-shaped, having opposite axial faces, the cage members carrying pin members in the finger structures, both said race members having blind bore passages for receiving said pins, said pins when in said blind bores preventing relative rotative movement between said inner and outer race members and their respective support cages.

6. The rotor support bearing assembly of claim 5 in which the pins extend axially alongside the cage finger portions, the blind bores in the race members extending axially a distance in each from the two opposite axial faces of such members.

7. The rotor support bearing assembly of claim 5 in which the pins extend radially of the support fingers, the blind bores in the race members extending radially a distance from at least one circumferential face of each race member and adjacent each axial face of such race members.

8. The rotor support assembly of claim 2 in which a cylindrical seal shell is disposed concentrically in each of the second pair cage members, each cylindrical seal shell having a flange at an end thereof, said flange being in axial abutment with the encircling end part of an associated second pair cage, an opposite end of the seal shell engaging a radially extending part on each finger structure.

9. The rotor support assembly of claim 8 in which the housing encircling the second pair cages includes an internal annular flange, said flange constituting a stop against which the seal shell end flange can be stopped when clamping the assembly in a predetermined axial positioning thereof.

10. The rotor support assembly of claim 9 in which the oppositely axially-directed force clamping means includes as components thread means carried on said housing and on said rotor shaft, and locknuts engageable with said thread means, said locknuts when advanced in a locking direction applying force in one direction against one cage member of each of the pairs of such members, the other cage member of each pair being stopped against abutments whereby reaction force is transmitted to said other cage members in direction opposite that applied to said one cage members.

11. The rotor support assembly of claim 2 in which the housing includes a sump passage, the sump passage being connected to a source of cooling medium, said sump passage having outlet therefrom at locations confronting the outer race member, the finger structures of said second cage pair having passage means formed therein for directing flow of a cooling medium against said outer race and said rolling-element members, said cooling medium flowing axially in opposite directions from its entry point through the longitudinal slots in said cage members, each seal shell having port means connecting the space inwardly of its associated cage support arms with the space enclosed by said seal shell, said last-mentioned space being open to the rolling-element members and said inner race whereby cooling medium entering the said last-mentioned space can flow onto said inner race and said rolling-element members to cool same, the finger structures of said first pair cage members having passage means formed therein for directing cooling medium flow against the inner race, said shaft being a hollow shaft and having a port means in the region of flow outlet from the first pair cage member passage means for admitting cooling medium flow into the shaft from whence such flow can be directed to a spent medium handling operation.

12. The rotor support bearing assembly of claim 11 in which the housing sump passage is defined by an annular enclosure formed exteriorly on the housing.

13. The rotor support bearing assembly of claim 11 further comprising axially directed labyrinth seal units disposed on each axial side of the bearing unit and intervening the first page cages and the seal shells.

14. The rotor support bearing assembly of claim 13 in which the labyrinth seal units comprise at least two axially spaced labyrinth rings, said rings being disposed axially symmetrically of the locations of the port means in the seal shells, the labyrinth rings proximal the bearing unit having through passages for communicating the space between said two rings with the space region adjacent the bearing unit.

15. The rotor support seal assembly of claim 13 in which the labyrinth seal units are connected to the first pair cages.

16. The rotor support seal assembly of claim 15 in which the labyrinth seal units are connected to the end flanges of the respective seal shells.

17. The rotor support unit of claim 16 in which the labyrinth seal units are made integral with the seal shells.

18. The rotor support bearing assembly of claim 2 in which the finger structures of each support arm include a lug having an axial part and a radial part joining the axial part to the support arm, the race members having notches formed inwardly from the opposite axial faces thereof, the lugs interfitting with the notches to interfittingly join the races to the cage members.

19. The rotor support bearing assembly of claim 2 in which the housing has an inner surface, said inner surface carrying a circle of spaced stops, the longitudinal slots in the second cage pair receiving said stops, said stops limiting any circumferential movement as may be produced in the second cage pair when subjected to abnormal loadings.

20. The rotor support bearing assembly of claim 11 in which the inner race member is comprised of two annular members arranged in axial face-to-face contact, at least one of said members having radial passages formed therein adjacent its contact face, said passages extending from the inner circumferential face of said one member to communication with a race course formed at the outer surface of said one member.

21. The rotor support bearing assembly of claim 2 in which an outer sleeve encirclingly intervenes the second pair cages and said housing.

22. The rotor support bearing assembly of claim 21 in which the outer sleeve has an inner surface carrying a circle of spaced stops, the longitudinal slots in the second cage pair receiving said stops, said stops limiting any circumferential movement as may be produced in the second cage pair when subjected to abnormal loadings.

23. The rotor support bearing assembly of claim 2 in which an inner sleeve encircles said shaft and intervenes said shaft and said first pair cages.

24. The rotor support bearing assembly of claim 23 in which the inner sleeve has an outer surface carrying a circle of spaced stops, the longitudinal slots in the first cage pair receiving said stops, said stops limiting any circumferential movement as may be produced in the first cage pair when subjected to abnormal loadings.

* * * * *